June 29, 1926.
W. A. McCARRELL
1,590,304
TRANSMISSION CLUTCH MECHANISM
Filed March 11, 1925
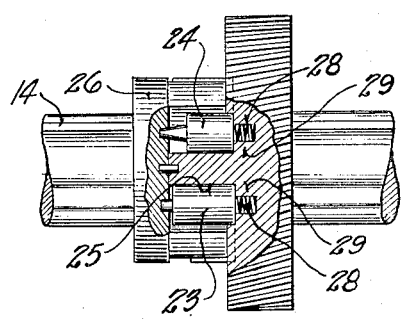
Fig. 2.
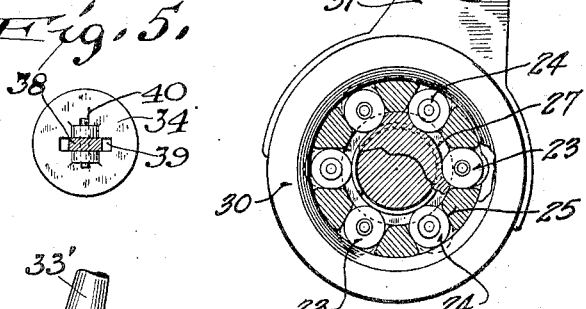
Fig. 3.
Fig. 5.
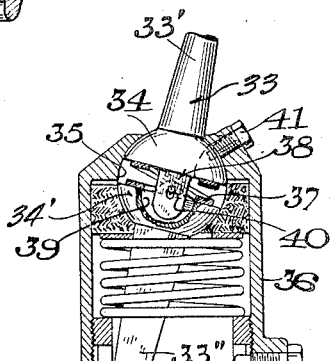
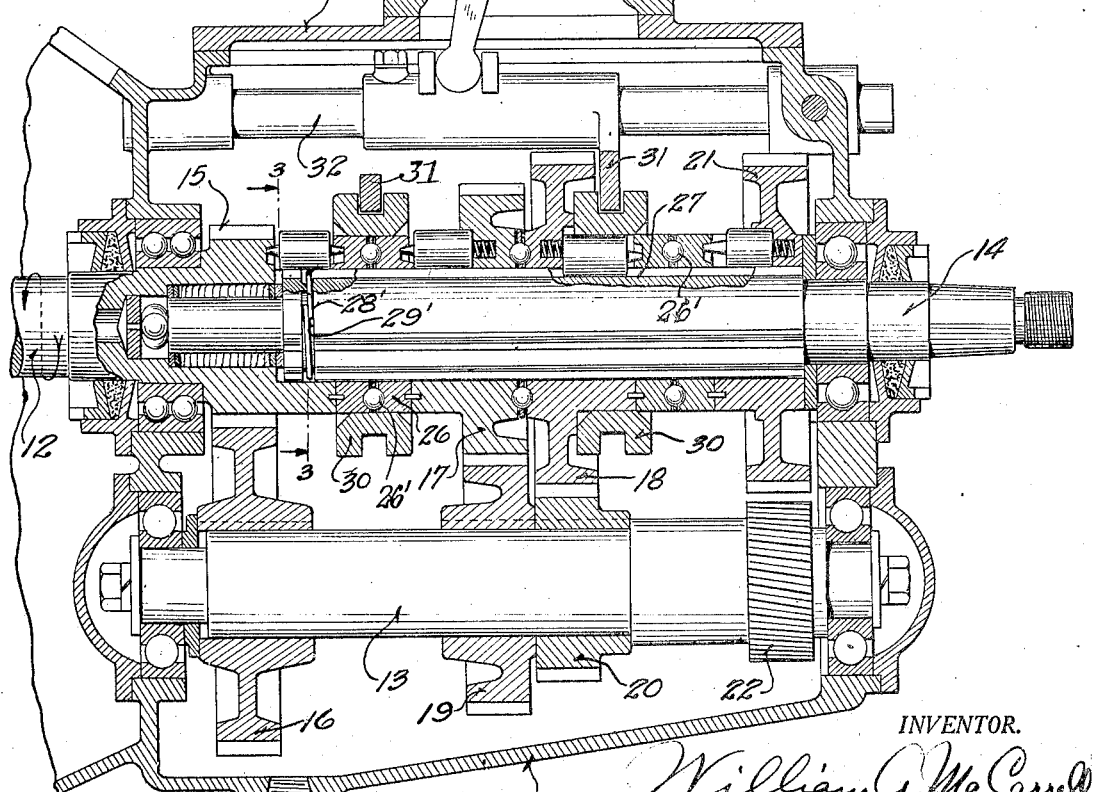
Fig. 1.
Fig. 4.
WITNESSES
George Mueller
M. E. Downey
INVENTOR.
William A. McCarrell
By R. S. Caldwell
ATTORNEY.

Patented June 29, 1926.

1,590,304

UNITED STATES PATENT OFFICE.

WILLIAM A. McCARRELL, OF MILWAUKEE, WISCONSIN.

TRANSMISSION-CLUTCH MECHANISM.

Application filed March 11, 1925. Serial No. 14,746.

The invention relates to transmission mechanism, more particularly to the clutch mechanism used to establish a driving connection through the type of transmission in which the gears are always in mesh, and to the shifting means controlling the operation of the clutch mechanism.

An object of the invention is to make certain novel improvements in the clutch mechanism of my prior United States Letters Patent No. 1,380,917, dated June 17, 1921, and No. 1,494,794, dated May 20, 1924, by providing means for retaining the clutch rollers out of the grooves in their cooperating shaft when the clutches are released, thereby avoiding the clicking noise which obtains under certain conditions of operation.

Another object of the invention is to provide a shifting means by which the speed changing operation may be effected smoothly and easily without transmitting to the operator the shock and varying resistance of engaging parts.

The invention further consists in the several features hereinafter set forth and more particularly defined by claims at the conclusion hereof.

In the accompanying drawings: Fig. 1 is a vertical longitudinal sectional view through a transmission mechanism embodying the invention;

Fig. 2 is a view partly in section of a roller clutch mechanism embodying the invention;

Fig. 3 is a transverse sectional view taken at the line 3—3 of Fig. 1;

Fig. 4 is a detail perspective view of one of the roller engaging springs; and

Fig. 5 is a detail top view of the lower part of the shifting member.

In these drawings, the numeral 10 designates a transmission casing, 11 a cover therefor and 12 the drive shaft, which may form a part of or be directly connected to the clutch shaft of the engine.

The transmission mechanism consists of an intermediate shaft 13 and a driven shaft 14, with gearing connections between the shafts 12 and 13 and 13 and 14 for low and second speeds and reverse drive, and a direct drive connection between the shafts 12 and 14 for high speed. The shafts 12 and 13 are parallel and journalled in the casing, while the shaft 14 has one end journalled in the casing and the other end within the shaft 12 to rotate coaxially therewith.

A gear 15, preferably helical, is formed on the end of the shaft 12 and meshes with a similar gear 16 keyed to the shaft 13. Gears 17 and 18 are loosely mounted on the shaft 14 and mesh with gears 19 and 20, respectively, keyed to the shaft 13 for second and low speeds, respectively. A gear 21 is loosely mounted on the shaft 14 and is drivingly connected by an idler gear (not shown) with a gear 22 keyed to the shaft 13 for reverse drive. The above gears are preferably helical but other types may be used with the clutch construction hereinafter described.

The gears 17, 18 and 21 and the shaft 12 are adapted to be selectively locked in driving relation with the shaft 14 by means of what may be termed "roller key clutches", to thereby transmit power at the low, second, or high speeds, or reverse, as desired. Each of these clutches embodies a plurality of rollers 23 and 24 disposed adjacent the periphery of the shaft 14 in radially extending slots 25 in the projecting hub portions of the gears 15, 17, 18 and 21. Collars 26 are doweled or otherwise secured to the ends of the hub portions to enclose the ends of the slots 25 and to prevent longitudinal movement of the rollers, and suitable provision is made at the ends of each roller to limit its outward radial movement in the slot 25. Suitable antifriction bearings 26' are provided between the collars of adjacent gears to receive the end thrust of the helical gears. The rollers 24 are shorter than the rollers 23 and are arranged alternately therewith about the shaft 14. For the purpose of locking the gears to the shaft 14 by means of the rollers 23 and 24, each set of these rollers in their respective gear hubs is adapted to be moved in the radially disposed slots 25 above described into splines 27 in the shaft 14 when the splines are in register with the slots. In the present instance each spline is wide enough to accommodate a pair of rollers, one of these being shorter than the other, and the edges of the slots 25 and the splines being suitably beveled to prevent undesired locking of the gear to the shaft by the rollers when they are not held in the splines by clutch-shifting mechanism hereinafter described.

The rollers are moved out of the splines by cam action and by centrifugal force, when of sufficient magnitude, but under certain conditions of operation a pronounced clicking noise is produced by the movement of the rollers into and out of the splines, which is noticeable when an otherwise silently operating transmission is obtained by the use of helical gears.

The present invention contemplates the retention of the rollers out of the splines when not acted upon by the clutch shifting mechanism hereinafter described, to thereby obtain a substantially noiseless transmission at all gear ratios.

For this purpose, the rollers are acted upon by springs which retain them out of the splines at their outer extreme positions. The rollers 23 and 24 in the gears 17, 18 and 21, each have one flat end against which a coil spring 28 bears to frictionally retain the roller in its position out of the splines, to which position it is forced by the relative rotation of the gear on the shaft or by centrifugal force, each spring being housed in a bore 29 in the gear adjacent the flat end of the roller. The rollers 23 and 24 in the gear 15 are urged outwardly and retained out of the splines by a spring loop 28' disposed in an annular groove 29' in the shaft 14, at the central portions of the rollers.

The edges of the rollers are suitably rounded or beveled to permit an annular clutch-shifting member 30 to be moved laterally toward the respective gear to be locked in engagement with the shaft and thereby force the long rollers and then the short rollers carried by this gear into the splines 27 in the shaft and allow said members to be moved over the rollers to maintain them in locking engagement with the shaft. The short rollers are operated after the long rollers to take up the back lash of the connection.

The flat ends of rollers 23 and 24 in the gears 17, 18, and 21 slide along the springs 28 when they are moved into the splines, and the rollers 23 and 24 in the gear 15 force the spring loop 28' inwardly into its annular groove 29' as they are moved into and adjacent the bottom of the splines.

The roller key clutches of the transmission are made to operate siliently by this invention and thereby minimize the noise produced by the transmission.

The clutch shifting members 30, when not establishing a driving connection by engagement with the clutch rollers, are disposed on the adjacent collars 26 in position to be selectively moved to operative position over the rollers in one of the several gears by forked members 31 secured on longitudinally slidable shifting shafts 32, which are disposed to be selectively actuated by a shifting lever 33 in the usual manner.

In order to obtain a very smoothly and easily operating shifting lever which will not transmit shocks of engaging parts to the operator, the shifting lever comprises complementary upper and lower portions 33' and 33'', respectively, with an interposed yieldable driving connection. The lower part 33'' is adapted to engage the shifting forks 31 while the upper part 33' is manipulated by the operator in the usual manner. Instead of the usual rigid ball about which the lever pivots, I provide the adjacent ends of the upper and lower parts of the shifting lever with spaced complementary ball portions 34 and 34', respectively, which are disposed in the usual spherical seat 35 in a lever housing 36 secured at the upper part of the transmission housing. A helical spring 37 is disposed between the spaced complementary ball portions and urges them apart against their spherical seat. To permit relative angular movement of the shifting lever parts in only a longitudinal plane and to simplify assembly, a flat-sided ear 38 depending from the upper ball portion 34 fits in a slot 39 in the lower ball portion 34', where it is held by a transversely extending pin 40 by which the lever parts are held together before being installed in the lever housing 36. It will be seen that sufficient play is provided to afford a relative angular displacement of the upper and lower lever portions in a longitudinal plane but that the fit of the ear 38 in the slot 39 is preferably such as to prevent any appreciable play of the parts when moved laterally for selective engagement of the shifting forks 31. The interlocking connection thus formed also prevents relative rotation of the upper and lower lever parts. The upper shifting lever part 33' is held against rotation within its seat by a screw 41 engaging a slot in the spherical end 34, or other usual similar expedient.

When speed changes are to be effected, the operator manipulates the upper end 33' of the shift lever in the usual manner but any resistance encountered in moving the clutch shifting parts will cause a relative angular displacement of the upper and lower lever parts, so that the lower lever part 33'' will not immediately move. This would be the case, for instance, when the rollers 23 and 24 momentarily occupy the ridge between the splines when the shifting collar 30 is moved against them. Then, at the moment the rollers are ready to enter the splines, the shifting collar 30 is urged over them by the pressure exerted by the spring 37, which has been compressed on one side, and this movement of the collar 30 occurs without any sudden movement being required of the upper part of the shifting lever. The shock of the engagement of the movable parts within the transmission housing does not affect the operator, since it is absorbed at the spring 37. It is obvious that a yielding shifting lever assembly functioning in this manner may be constructed in various ways and may be applied to other types of transmissions, but is particularly effective in the type of transmission illustrated.

By this invention, the speed changing operation is accomplished smoothly and with very little effort on the part of the operator, and results in comparatively silent operation with the minimum of wear on the parts.

What I claim as new and desire to secure by Letters Patent is:

1. In a transmission mechanism, the combination of a shaft having peripheral recesses, a rotatable member mounted on said shaft and having a portion surrounding the recesses and provided with apertures adapted to register with said recesses, clutch members disposed in said apertures and movable therein, means operative at low rotative speeds for retaining said clutch members out of said recesses during the relative rotation of said shaft and rotatable member, and means mounted on said rotatable member and cooperating with said clutch members to project the latter into said recesses.

2. In a transmission mechanism, the combination of a shaft having peripheral recesses, a rotatable member mounted on said shaft and having a portion surrounding the recesses and provided with apertures adapted to register with said recesses, clutch members disposed in said apertures and movable therein, spring means for retaining said clutch members out of said recesses during the relative rotation of said shaft and rotatable member, and means mounted on said rotatable member and cooperating with said clutch members to project the latter into said recesses.

3. In a transmission mechanism, the combination of a shaft having peripheral recesses, a rotatable member mounted on said shaft and having a portion surrounding the recesses and provided with apertures adapted to register with said recesses, clutch rollers disposed in said apertures and movable therein, springs acting on said rollers for retaining them out of said recesses during the relative rotation of said shaft and rotatable member, and means mounted on said rotatable member and cooperating with said clutch rollers to project the latter into said recesses.

4. In a transmission mechanism, the combination of a shaft having peripheral recesses, a rotatable member mounted on said shaft and having a portion surrounding the recesses and provided with apertures adapted to register with said recesses, clutch rollers disposed in said apertures and movable therein, springs carried by said rotatable member and frictionally bearing on the ends of said rollers for retaining said rollers out of said recesses during the relative rotation of said shaft and rotatable member, and means mounted on said rotatable member and co-operating with said clutch rollers to project the latter into the recesses of said shaft.

In testimony whereof I affix my signature.

WILLIAM A. McCARRELL.